United States Patent
Baumert et al.

(10) Patent No.: US 6,516,905 B1
(45) Date of Patent: Feb. 11, 2003

(54) VEHICLE WITH A FUEL CELL SYSTEM AND METHOD FOR OPERATING THE SAME

(75) Inventors: Rob Baumert, San Diego, CA (US); Craig Greenhill, Richmond (CA); Robert Hastings, San Diego, CA (US); Jim Smith, San Diego, CA (US)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/935,763

(22) Filed: Aug. 24, 2001

(51) Int. Cl.$^7$ ............................................... B60K 17/28
(52) U.S. Cl. ........................ 180/53.8; 290/1 R; 205/343
(58) Field of Search ............................... 180/65.1, 65.2, 180/65.3, 65.4, 53.1, 53.5, 53.8; 429/17, 21; 290/1 R, 4 R, 4 A; 204/278; 205/343

(56) References Cited

U.S. PATENT DOCUMENTS

| | | | | |
|---|---|---|---|---|
| 4,657,829 A | * | 4/1987 | McElroy et al. | 429/19 |
| 5,346,778 A | * | 9/1994 | Ewan et al. | 429/19 |
| 5,506,066 A | * | 4/1996 | Sprouse | 429/21 |
| 5,512,145 A | * | 4/1996 | Hollenberg | 205/628 |
| 5,845,485 A | * | 12/1998 | Murphy et al. | 60/274 |
| 5,900,330 A | * | 5/1999 | Kagatani | 429/17 |
| 6,107,691 A | * | 8/2000 | Gore et al. | 290/1 R |
| 6,380,637 B1 | * | 4/2002 | Hsu et al. | 290/1 R |

* cited by examiner

Primary Examiner—Brian L. Johnson
Assistant Examiner—Bryan Fischmann
(74) Attorney, Agent, or Firm—Crowell & Moring LLP

(57) ABSTRACT

A vehicle comprising a combustion engine capable of delivering mechanical power for driving at least one wheel drive shaft with driving wheels, auxiliary vehicular electric loads, an alternator powered by the combustion engine for generating electricity, an electric storage device for storing alternator generated electricity, and at least one auxiliary electric power supply for supplying electrical energy to said electric loads. The auxiliary electric power supply includes a fuel cell system with an anode fuel input and a cathode fuel input, and an electrolyzer which is capable of generating hydrogen and oxygen. The hydrogen production side of said electrolyzer is in fluid connection with the at least one anode fuel supply.

14 Claims, 1 Drawing Sheet

VEHICLE WITH A FUEL CELL SYSTEM AND METHOD FOR OPERATING THE SAME

BACKGROUND AND SUMMARY OF THE INVENTION

The invention relates to a vehicle with a fuel cell system and a method for operating the same.

U.S. Pat. No. 4,657,829 discloses a fuel cell vehicular power plant. Fuel for the fuel cell stack is supplied by a hydrocarbon catalytic cracking reactor and CO shift reactor. A water electrolysis subsystem is associated with the stack. During low power operation part of the fuel cell power is used to electrolyze water with hydrogen and oxygen electrolysis products being stored in pressure vessels. During peak power intervals (viz, during acceleration or start-up), pure oxygen and pure hydrogen from the pressure vessels are supplied as the reaction gases to the cathodes and anodes of the fuel cell stack in place of air and hydrocarbon reformate. However, for a standard motor vehicle there is no fuel production solution for a fuel cell power unit to operate on the same fuel as the standard motor vehicle, i.e., gasoline or diesel fuel.

One object of the invention is to provide a vehicle with a fuel cell power system and a method for operating the same which allows the fuel cell system to operate on the same fuel as the vehicle's combustion engine.

Another object and advantage is achieved by the power supply system according to the invention, which includes a combustion engine capable of delivering mechanical power for driving at least one wheel drive shaft with driving wheels, auxiliary vehicular electric loads, an alternator powered by the combustion engine for generating electricity, an electric storage device for storing alternator generated electricity, and at least one auxiliary electric power supply for supplying electrical energy to said electric loads. The auxiliary electric power supply includes a fuel cell system with an anode fuel input and a cathode fuel input, and an electrolyzer which is capable of generating hydrogen and oxygen. The hydrogen production side of said electrolyzer is in fluid connection with the at least one anode fuel supply.

The invention allows the fuel cell system to operate at least indirectly on vehicle based fuels, so that it is unnecessary to store two fuels on board of the vehicle to operate the engine and the fuel cell.

Other objects, advantages and novel features of the present invention will become apparent from the following detailed description of the invention when considered in conjunction with the accompanying drawings.

DETAILED DESCRIPTION OF THE DRAWINGS

The invention can be advantageously used in motor vehicles where a fuel cell system supplies electric energy for low power requirements, especially trucks which frequently idle their high power engines for extended periods to meet their low power requirements.

Figure 1:
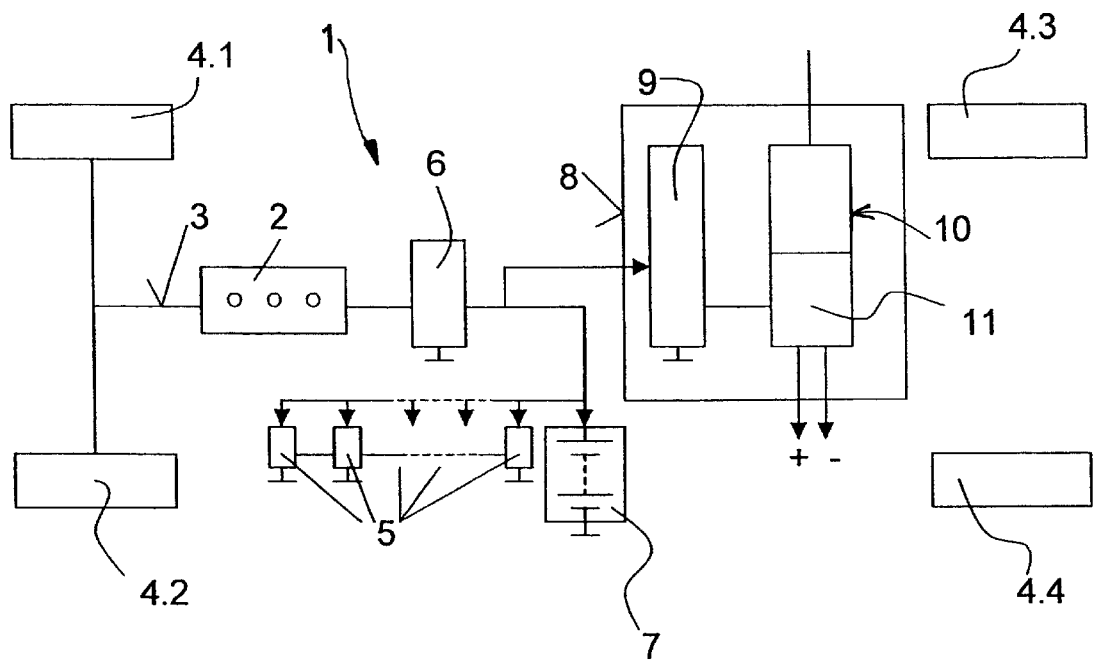
FIG. 1 shows a schematic sketch of a first preferred embodiment of a vehicle with a combustion engine and a fuel cell system according to the invention.

FIG. 1 shows a schematic drawing of a preferred embodiment of the invention, in a vehicle 1 with a combustion engine 2 and a fuel cell system 10 included in an auxiliary electric power unit 8 (APU system). The vehicle 1 has wheels 4.1, 4.2, 4.3, 4.4 with at least two driveable wheels 4.1, 4.2 being driveable via the drive shaft 3 as is known in the art. The vehicle 1 may also be equipped with more than one driveable axle.

The vehicle 1 is also equipped with a conventional alternator 6, an electric storage device 7 and various low power electric loads 5. Alternator 6 produces electric power while the engine 2 is operative. The electric storage device 7 is used for starting the engine and/or can be used to store electric power produced by the alternator 6.

The various electric loads 5 are preferably low power electric equipment such as is usually present on a vehicle, preferably a truck, such as lighting, electric auxiliary drives, water pumps, air conditioner, radio, coffee maker, microwave oven, refrigerator and so on.

According to the invention, electric power from the vehicle based alternator 6 is used to produce hydrogen as fuel for the fuel cell system 10 while the combustion engine 2 is operative. The hydrogen is advantageously stored in a hydrogen tank (not shown). When the engine 2 is inoperative, the hydrogen is consumed in the fuel cell system 10 and electric power is delivered by the fuel cell stack 11. This is indicated by the +/− arrows in the figure.

Hydrogen is produced by an electrolyzer 9 which is powered by the alternator 6 by disintegrating water from a water supply tank 19. In absence of such a system, vehicles such as Class 8 trucks simply idle their high power engines 2 for extended periods to meet their low power requirements. As this is a very inefficient means of generating electric power for low power requirements the overall efficiency of the vehicle 1 is enhanced by the invention. Environmental pollution is reduced. As the low power requirements are fulfilled by the fuel cell system when the engine is not running, for example when the truck stops overnight, vehicular noise is reduced substantially, and comfort for passengers is increased.

According to the invention electric power produced by the vehicle alternator is used to electrolyze water (generating hydrogen and oxygen by hydrolysis) while the vehicle is operative and then this hydrogen is used when the vehicle is inoperative.

Figure 2:
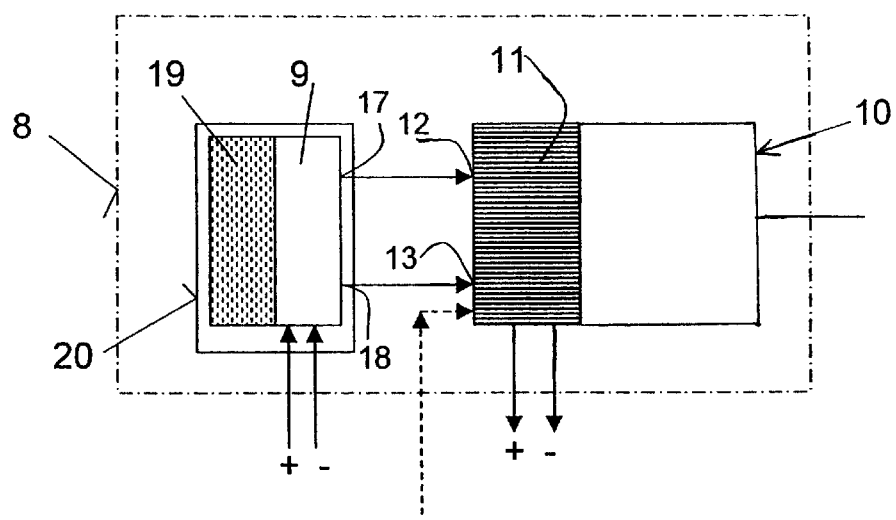
FIG. 2 shows a detail of the auxiliary power unit in a vehicle.

In a preferred embodiment the electrolyzer 9 is included in the APU system 8, which is shown schematically in more detail in FIG. 2. When the vehicle's combustion engine 2 is operative the electrolyzer 9 produces hydrogen and oxygen. The hydrogen production side 17 of the electrolyzer 9 is connected to the anode fuel input 12 of the fuel cell stack 11. The oxygen production side 18 of the electrolyzer 9 can be connected with the cathode fuel input 13 of the fuel cell stack 11. Additionally or alternatively ambient air can be used as cathode fuel. This is indicated by the dashed arrow in the figure.

Electric power for the electrolysis of the water from water supply tank 19 is preferably delivered from the alternator 6. The hydrogen is preferably stored in a hydrogen storage tank. In one embodiment, by containing the electrolyzer 9 in a pressurized housing 20 and feeding it with a supply of compressed water from a water tank 19, the hydrogen could be generated at high pressure. In this case, the fuel cell system 10 (or at least the fuel stack 11) and the electrolyzer 9 can favorably be housed by the common pressurized housing 20.

Further the water in the water tank 19 could be pressurized by the hydrogen being produced by the electrolyzer 9.

In a preferred embodiment both the electrolyzer 9 and the water supply 19 are contained in the same pressure housing 20. In this manner the pressure housing 20 for the electrolyzer 9 could also serve as the pressure tank for the hydrogen being produced. However, other methods can be used which allow the hydrogen to be generated at high pressure without employing a pressure housing 20 for the electrolyzer 9.

In another preferred embodiment the electrolyzer 9 is equipped with a membrane which can maintain high pressure differentials, so that hydrogen is produced at high pressures without enclosing the electrolyzer 9 in a pressure vessel 20.

Using an electrolyzer 9 in the ways described above eliminates the requirement for an expensive and complex fuel processing mechanism, and allows the fuel cell system 10 to operate at least indirectly at the same fuel as the vehicle's internal combustion engine 2. While electrolysis normally is an inefficient means for producing hydrogen, it is still more efficient than idling a 600 horsepower engine of a truck to produce electric power for low power requirements.

By combining the electrolyzer 9, water supply tank 19 and hydrogen storage vessel, the overall size and complexity of the APU system 8 is greatly reduced. With proper filtration, the system can operate on tap water, allowing simple top up of whatever water is not recovered from the fuel cell system 10. Electrolyzer hardware is well developed, reliable and cheap. Five liters of water would convert to approximately 10 kWhrs worth of hydrogen. If housed in a 20 liter tank, this hydrogen would be generated at approximately 4500 psig.

foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
   a combustion engine coupled to deliver mechanical power to propel the vehicle;
   auxiliary vehicular electric loads;
   an alternator powered by the combustion engine, for generating electricity;
   an electric storage device for storing alternator generated electricity;
   at least one auxiliary electric power supply for supplying electrical energy to said electric loads, the auxiliary electric power supply including a fuel cell system with an anode fuel input and a cathode fuel input; and
   an electrolyzer which uses electricity from the alternator to generate hydrogen and oxygen;
   wherein a hydrogen production side of the electrolyzer is in fluid communication with the anode fuel input.

2. The vehicle according to claim 1, wherein an oxygen production side of the electrolyzer is in fluid communication with the cathode fuel input.

3. The vehicle according to claim 1, wherein a hydrogen production side of said electrolyzer is at high pressure.

4. The vehicle according to claim 1, wherein the electrolyzer is housed in a pressure housing.

5. The vehicle according to claim 1, wherein a medium for compressing water in a water supply tank is hydrogen produced by said electrolyzer.

6. The vehicle according to claim 5, wherein the electrolyzer and said water supply tank are housed in a common housing.

7. The vehicle according to claim 5, wherein a filtration means is arranged between the water supply tank and the electrolyzer.

8. The vehicle according to claim 5, wherein the electrolyzer, water supply tank and a hydrogen storage vessel are integrated in said auxiliary electric power supply.

9. A method for operating a vehicle having:
   a combustion engine coupled to deliver mechanical power to propel the vehicle;
   auxiliary vehicular electric loads;
   an alternator powered by the combustion engine, for generating electricity;
   an electric storage device for storing alternator generated electricity;
   at least one auxiliary electric power supply for supplying electrical energy to said electric loads, the auxiliary electric power supply including a fuel cell system with an anode fuel input and a cathode fuel input; and
   an electrolyzer which uses electricity from the alternator to generate hydrogen and oxygen; wherein
   a hydrogen production side of the electrolyzer is in fluid communication with the anode fuel;
   hydrogen is produced by the electrolyzer while the vehicle's engine is operative; and
   said hydrogen is used to power a fuel cell system while the engine is inoperative.

10. The method according to claim 9, wherein the hydrogen is stored in a hydrogen storage tank.

11. The method according to claim 9, wherein the hydrogen is produced at high pressure.

12. The method according to claim 9, wherein the hydrogen produced by the electrolyzer is used as a pressure medium to pressurize water in a water supply tank.

13. A method for supplying electrical power to operate electrical load components of a vehicle having a combustion engine, an electric generator driven by said engine and a fuel cell system, said method comprising:
   operating said engine to propel the vehicle;
   using electricity from said generator when said engine is operating, to generate hydrogen and oxygen by hydrolysis of water;
   storing said hydrogen and oxygen;
   supplying said stored hydrogen and oxygen to said fuel cell system to generate electric power for said electrical load components during periods when said engine is not operating.

14. A vehicle power supply comprising:
   a combustion engine for propelling said vehicle;
   an electric generator driven by said engine;
   a fuel cell system;
   means for generating hydrogen and oxygen using electricity generated while said engine is operating;
   a tank for storing generated hydrogen and oxygen; and
   means for supplying stored hydrogen and oxygen to said fuel cell system when said engine is not operated, to supply electric power to electrical load components of said vehicle.

* * * * *